Figure 1:
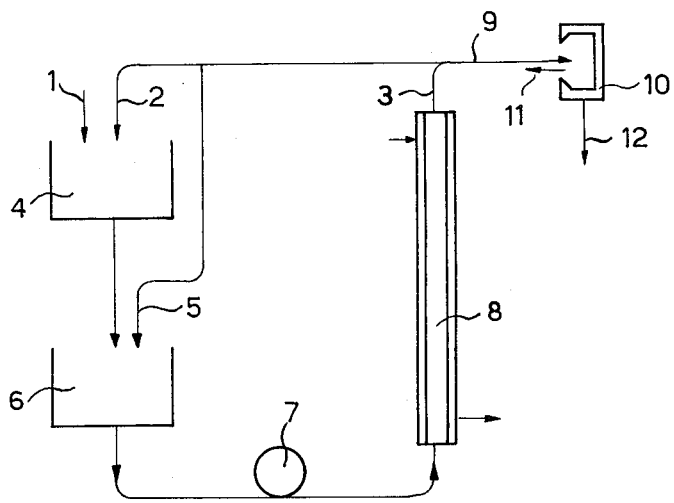

July 2, 1963  J. C. SOETERBROEK ETAL  3,096,369
THREE STEP CRYSTALLIZATION OF ADIPIC ACID
Filed Dec. 2, 1958

Inventors
Johannes C. Soeterbroek
Renier J. L. Graff
By Cushman, Darby & Cushman
Attorneys

United States Patent Office 3,096,369
Patented July 2, 1963

3,096,369
THREE STEP CRYSTALLIZATION OF ADIPIC ACID
Johannes C. Soeterbroek, Geleen, and Renier J. L. Graff, Beek, Netherlands, assignors to Stamicarbon N.V., Heerlen, Netherlands
Filed Dec. 2, 1958, Ser. No. 777,739
Claims priority, application Netherlands Dec. 9, 1957
1 Claim. (Cl. 260—537)

The present invention relates to a method of crystallizing adipic acid by cooling an adipic acid solution until a crystal suspension is obtained.

The crystallization of adipic acid is attended with great difficulties. It repeatedly happens that in the crystallization of adipic acid a milky product is obtained which contains crystal particles of such small dimensions that they are difficult to separate from the mother liquor. An even greater difficulty is caused by crusts of crystals depositing on the cooling surface, as a result of which the heat transfer and consequently the crystallization rate are reduced to a minimum. It is, therefore, necessary at periodic intervals to discontinue operation of the crystallization apparatus for the purpose of cleaning same, unless the apparatus is provided with means by which the crystal deposits may be continuously removed. This latter provision, however, entails the disadvantages of heavy wear and complicated apparatus.

In view of the above disadvantages, it has previously been suggested (U.S. Patent No. 2,813,122, issued November 12, 1957) to carry out a cyclic process in which the hot adipic acid solution is first introduced into a zone in which the solution is supersaturated by cooling and subsequently fed into a second zone in which crystallization takes place. This process requires that care be taken to maintain a certain concentration of acids other than adipic acid in the mother liquor. Furthermore, crystallization must take place at 40–70° C.

The principal object of the present invention is the provision of a novel method for crystallizing adipic acid whereby the abovementioned disadvantages of prior crystallization procedures are obviated. A more specific object of the invention is to provide a method for crystallization adipic acid whereby the formation of a milky product and undesired caking are avoided. Another object is to provide a practical and commercially attractive method of crystallizing adipic acid from solutions containing same. Other objects will also be apparent from the following detailed description of the invention.

Broadly stated, the foregoing objects are realized, according to the invention, by the provision of a method which comprises cooling an adipic acid solution until a crystal suspension is obtained, recycling a part of this cool crystal suspension and/or mother liquor obtained therefrom by separating off the crystals and utilizing this recycled liquid to cool additional adipic acid solution to a temperature below 30° C. by mixing the same together and thereafter further cooling the resulting mixture by passing same through a cooler whereby the mixture is indirectly cooled to the desired temperature, e.g. 5 to 25° C. A part of the resulting suspension of crystals may be used directly as the cooling liquid or, if desired, crystals may be separated therefrom and the remaining mother liquor used as the cooling medium.

It has been found that the method outlined in the preceding paragraph effectively avoids the difficulties hitherto encountered in crystallizing adipic acid from solutions containing same. The method permits the necessary amount of heat to be removed from the adipic acid solution to effect crystallization of the adipic acid in a way that prevents caking from taking place on the cooling surfaces.

The success of the invention is due, to a large extent, to the step of directly cooling the solution, by means of the recycle crystal suspension and/or mother liquor obtained therefrom, to a temperature below 30° C. prior to passing same through an external or indirect cooler to complete the cooling operation. Thus, if the crystal suspension is fed through the external cooler at a temperature exceeding 30° C., it is difficult, if not impossible, to prevent caking on the cooling surface.

The adipic acid crystals may be separated from the finally cooled suspension in conventional manner, e.g., by suitable centrifuge means. The amount of suspension and/or mother liquor recycled for the initial direct cooling step will vary depending, for example, upon such operating factors as the ultimate temperature desired, the temperature of the suspension and/or mother liquor, etc. Preferably, the method is operated at atmospheric pressure but other pressure conditions may be used if desired.

The invention is applicable to the crystallization of adipic acid from varying types of solutions thereof. Thus, solutions of adipic acid in water or organic solvents, e.g., cyclohexanol, may be treated according to the invention. Typically, these aqueous solutions will have adipic acid concentrations of the order of 20 to 60% by weight although it will be recognized that concentrations outside this range may also be used.

Preferably, the method of the invention is carried out in such a way that the mixing of the adipic acid solution with the recycled crystal suspension and/or mother liquor takes place in stages, a temperature between 35 and 70° C. being maintained in the first stage with the second and any further stages bringing the temperature below 30° C., usually 10 to 25° C. The advantage of this multi-stage direct cooling embodiment is that the mean size of the resulting crystals is considerably greater as the majority of them are formed at a temperature exceeding 35° C.

It should be remarked that it is a known fact (see the abovementioned U.S. Patent 2,813,122) that the size of the adipic crystals increases, the higher the temperature at which the crystals are formed. Thus, at higher temperatures the rate of growth of the crystals increases, whereas the rate of nucleus formation decreases, so that bigger crystals are formed. The preferred embodiment of the invention, involving the multi-stage direct cooling of the adipic acid solution, offers the advantage of crystallization at higher temperature with the resulting formation of bigger crystals.

At the same time, the detrimental effects of indirect cooling of the adipic solution at higher temperature, namely, the almost inevitable caking of crystals to the cooling spirals at such higher temperatures, is non-existent in the present method since the cooling at higher temperatures is effected directly rather than indirectly.

In the commercial preparation of adipic acid, crystallization usually takes place twice. The first crystallization takes place from the solution in which the adipic acid is formed by oxidation of, for instance, cyclohexanol. If this oxidation is carried out with an excess of nitric acid, the solution will contain nitric acid. According to the present invention, the crystallization of adipic acid from a solution containing nitric acid is preferably carried out in such a way that the adipic acid solution is mixed with crystal suspension in two stages. In this case the mother liquor (without crystals) is, consequently, not recycled. This offers the advantage that the crystal concentration of the final suspension fed to the centrifuge or other crystal separating means has a value such that the separating means can function properly.

The second crystallization in the conventional adipic acid procedures takes place from an aqueous solution. According to the present invention, this crystallization is preferably carried out in two mixing stages, the adipic acid solution being mixed in the first stage with mother liquor and in the second with crystal suspension. The advantage of this is that the crystal concentration of the suspension to be fed to the external cooler will be such that the suspension is properly pumpable.

Figure 2:
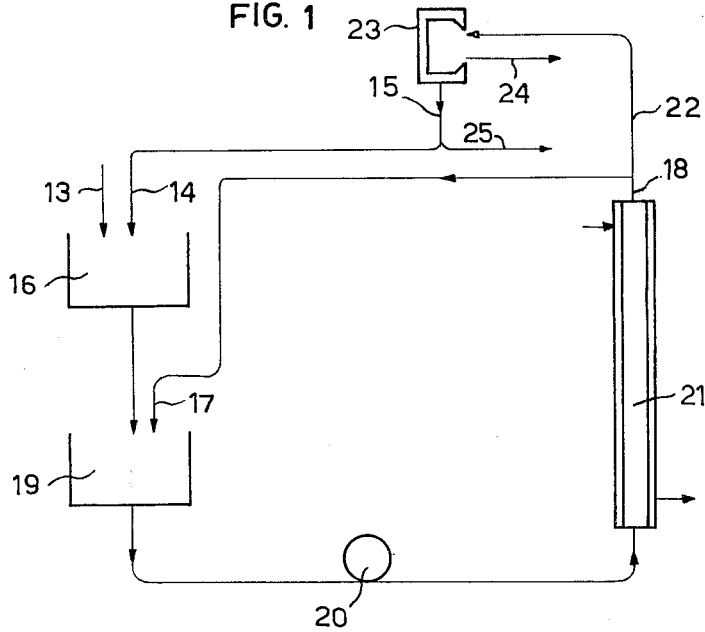

The invention is illustrated in the accompanying drawing which, diagrammatically shows, by way of example, a preferred method of crystallizing adipic acid from a solution containing nitric acid in FIGURE 1, and a preferred method of crystallizing the acid from aqueous solution in FIGURE 2.

Referring to FIGURE 1, hot adipic acid solution 1, together with a portion 2 of the cool previously obtained crystal suspension 3, is fed into a first crystallizer 4, in which a crystal suspension having a temperature of 35–70° C. is formed. This suspension, together with another portion 5 of the previously obtained crystal suspension 3 is continuously fed into a second crystalizer 6. By means of a pump 7, the crystal suspension issuing from the second crystallizer 6 is fed at a temperature below 30° C. to a cooler 8, in which further cooling takes place. A portion 9 of the crystal suspension 3 issuing from the cooler 8 is fed to a centrifuge 10 from which adipic acid crystals 11 and mother liquor 12 are discharged. The remainder of suspension 3 is recycled to the crystallization vessels as shown.

According to FIGURE 2, the hot adipic acid solution 13, together with a portion 14 of cool, previously obtained mother liquor 15, is led into a first crystallizer 16, in which a crystal suspension having a temperature of 35–70° C. is obtained. This suspension, together with a portion 17 of cool previously obtained crystal suspension 18, is fed into a second crystallizer 19. By means of a pump 20, the crystal suspension issuing from the second crystallizer 19 is fed at a temperature below 30° C. to an external cooler 21 in which further cooling takes place. A portion 22 of the crystal suspension 18 issuing from the external cooler 21 is fed to the centrifuge 23, from which adipic acid crystals 24 and mother liquor 15 are discharged. A portion 25 of the mother liquor 15 is withdrawn from the process while the remainder of the mother liquor is fed to the first crystallizer 16 as heretofore indicated. Similarly, the balance of the suspension from cooler 21 is fed to the second crystallizer 19.

The systems shown in FIGURES 1 and 2 may be modified in a variety of ways. Thus, for instance, part of the crystal suspension issuing from the second crystallizer may be fed directly to the centrifuge rather than being further cooled by the indirect cooling means. It is also possible to provide a cooling surface, e.g., cooling spirals in or around the first and/or second crystallizers and maintain such a small temperature difference between the cooling agent and the contents of the crystallization vessels that the caking of crystals on the spirals or like means (if placed within the vessels) is reduced to a minimum. However, in this case only a very small portion of the amount of heat to be removed by the system can be withdrawn by such cooling means.

The invention is further illustrated by the following examples.

*Example 1*

Per hour 440 kg. of a liquid having a temperature of 90° C. and composed of 330 kg. of 53% by weight nitric acid and 110 kg. of dissolved adipic acid, was continuously mixed in a first crystallization vessel, with 710 kg. of crystal suspension having a temperature of 15° C. and composed of 533 kg. of 53% by weight nitric acid, 10 kg. of dissolved adipic acid and 167 kg. of crystals (as illustrated in FIGURE 1). The crystal suspension from the first crystallization vessel at a temperature of about 45° C., was mixed in a second crystallization vessel with such an amount of the crystal suspension of 15° C. temperature, that the suspension leaving the second crystallization vessel had a temperature of about 20° C. At the rate of 7,500 kg./h. this suspension was then pumped through a tubular cooler, in which the suspension was cooled to 15° C. Per hour 440 kg. of the suspension leaving the cooler was fed to the centrifuge wherein 104 kg. of adipic acid crystals was separated off. At no stage was the suspension milky and there was no caking of crystals to the cooling surface.

*Example 2*

Per hour 200 kg. of a 50% by weight adipic acid solution in water having a temperature of 90° C. was continuously mixed with 138 kg. of mother liquor of 12.5° C. in a first crystallization vessel. The crystal suspension leaving the first crystallization vessel at a temperature of about 65° C. was mixed in a second crystallization vessel with such an amount of crystal suspension of 12.5° C. that the suspension leaving this second crystallization vessel had a temperature of about 15° C. At the rate of about 8,500 kg./h. this suspension was passed through a tubular cooler, in which the suspension was cooled to 12.5° C. Per hour 338 kg. of this suspension was fed to the centrifuge, in which 98 kg. of adipic acid crystals was separated off. Per hour 102 kg. of the mother liquor was expelled from the system, the remainder being recycled for further cooling in the first crystallization vessel. The suspension was not milky at any stage and there was no caking of crystals to the cooling surface.

It will be appreciated that various modifications may be made in the invention as illustrated above without deviating from the scope thereof as set forth in the following claim.

We claim:

In a method for obtaining crystalline adipic acid from an adipic acid solution wherein said solution is cooled to give a suspension of adipic acid crystals in mother liquor and adipic acid crystals are recovered from said suspension, the improvement consisting of directly cooling said solution by mixing the same in a first crystallizing zone with a cooling agent selected from the group consisting of a suspension of adipic acid crystals in mother liquor and mother liquor obtained from such a suspension, to give a suspension of adipic acid crystals in mother liquor having a temperature between 35 and 70° C., passing a suspension of adipic acid crystals in mother liquor from said first crystallizing zone into a second crystallizing zone, directly cooling said suspension within said second crystallizing zone by mixing the same with a cooling agent consisting of a suspension of adipic acid crystals in mother liquor to give a cool suspension of adipic acid crystals in mother liquor having a temperature between 10 and 30° C., and thereafter further cooling said cool suspension indirectly to a temperature between about 5 and 25° C., and recovering adipic acid crystals from said cool suspension.

References Cited in the file of this patent

UNITED STATES PATENTS

| | | |
|---|---|---|
| 1,916,825 | Burroughs | July 4, 1933 |
| 2,191,786 | Aronow | Feb. 27, 1940 |
| 2,713,067 | Hamblet et al. | July 12, 1955 |
| 2,813,122 | Clark et al. | Nov. 12, 1957 |

OTHER REFERENCES

Perry et al: "Chemical Engineer's Handbook," 3rd edition, 1950 (pages 1063–1064).